United States Patent
Labarbera et al.

(10) Patent No.: US 12,545,315 B2
(45) Date of Patent: Feb. 10, 2026

(54) TACTILE DRIVER FEEDBACK VIA THE STEERING WHEEL DURING BRAKE-TO-STEER FALL BACK FOR A STEER-BY-WIRE SYSTEM

(71) Applicants: Steering Solutions IP Holding Corporation, Auburn Hills, MI (US); Continental Automotive Systems, Inc., Auburn Hills, MI (US)

(72) Inventors: Joseph A. Labarbera, Auburn Hills, MI (US); Clinton L. Schumann, Holly, MI (US); Scott T. Sanford, Swartz Creek, MI (US); Michael S. Wyciechowski, Grand Blanc, MI (US)

(73) Assignees: Steering Solutions IP Holding Corporation, Auburn Hills, MI (US); Continental Automotive Systems Inc, Auburn Hills, MI (US)

( * ) Notice: Subject to any disclaimer, the term of this patent is extended or adjusted under 35 U.S.C. 154(b) by 916 days.

(21) Appl. No.: 17/826,553

(22) Filed: May 27, 2022

(65) Prior Publication Data
US 2023/0058353 A1     Feb. 23, 2023

Related U.S. Application Data

(60) Provisional application No. 63/233,834, filed on Aug. 17, 2021.

(51) Int. Cl.
  *B62D 5/00*     (2006.01)
  *B62D 6/00*     (2006.01)

(52) U.S. Cl.
  CPC ............. *B62D 5/006* (2013.01); *B62D 6/008* (2013.01)

(58) Field of Classification Search
  CPC ................................ B62D 5/006; B62D 6/008
  USPC .................................................. 180/402, 446
  See application file for complete search history.

(56) References Cited

U.S. PATENT DOCUMENTS

| | | | |
|---|---|---|---|
| 10,046,743 B2 * | 8/2018 | Jonasson | B62D 9/005 |
| 10,046,749 B2 | 8/2018 | Jonasson et al. | |
| 2007/0299580 A1 * | 12/2007 | Lin | B60W 50/16 701/41 |

FOREIGN PATENT DOCUMENTS

| | | |
|---|---|---|
| DE | 60315766 T2 | 1/2008 |
| DE | 102013016040 A1 | 4/2014 |
| DE | 102015009241 A1 | 1/2017 |
| DE | 102017008409 A1 | 3/2018 |

OTHER PUBLICATIONS

CN Office action dated May 23, 2025 for CN application No. 202210979285.2.
DE Office action dated Jul. 26, 2024 for DE application No. 102022117665.7.

* cited by examiner

*Primary Examiner* — Jacob D Knutson
(74) *Attorney, Agent, or Firm* — Ingrassia Fisher & Lorenz, LLP

(57) ABSTRACT

A number of illustrative variations may include a system and method of modifying steering wheel effort and end of travel limits dynamically during electronic power steering failure, steer-by-wire failure, or brake-to-steer implementation within a vehicle where steering systems have degraded or failed to provide a driver with a normal or near-normal steering driving experience while brake-to-steer systems are in use.

12 Claims, 2 Drawing Sheets

TACTILE DRIVER FEEDBACK VIA THE STEERING WHEEL DURING BRAKE-TO-STEER FALL BACK FOR A STEER-BY-WIRE SYSTEM

CROSS-REFERENCE TO RELATED APPLICATIONS

This application claims the benefit of U.S. Provisional Application Ser. No. 63/233,834 filed Aug. 17, 2021.

TECHNICAL FIELD

The field to which the disclosure generally relates to includes steering systems.

BACKGROUND

Vehicles typically include steering systems including electronic power steering systems incorporating steer-by-wire technology.

SUMMARY OF ILLUSTRATIVE VARIATIONS

A number of illustrative variations may include a system and method of modifying steering wheel effort and end of travel limits dynamically during brake-to-steer implementation within a vehicle where steering systems have failed. A brake-to-steer system may include supplying varying brake pressure, as needed, to different vehicle wheels to steer the vehicle. A brake-to-steer system may reduce a vehicles lateral performance in comparison to normal steering. Modifying a steering wheel's required effort and end of travel limits dynamically based on feedback from vehicle systems and electronic braking systems may provide a driver with a required steering effort that communicates information regarding vehicle response and capabilities while brake-to-steer systems are in use.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
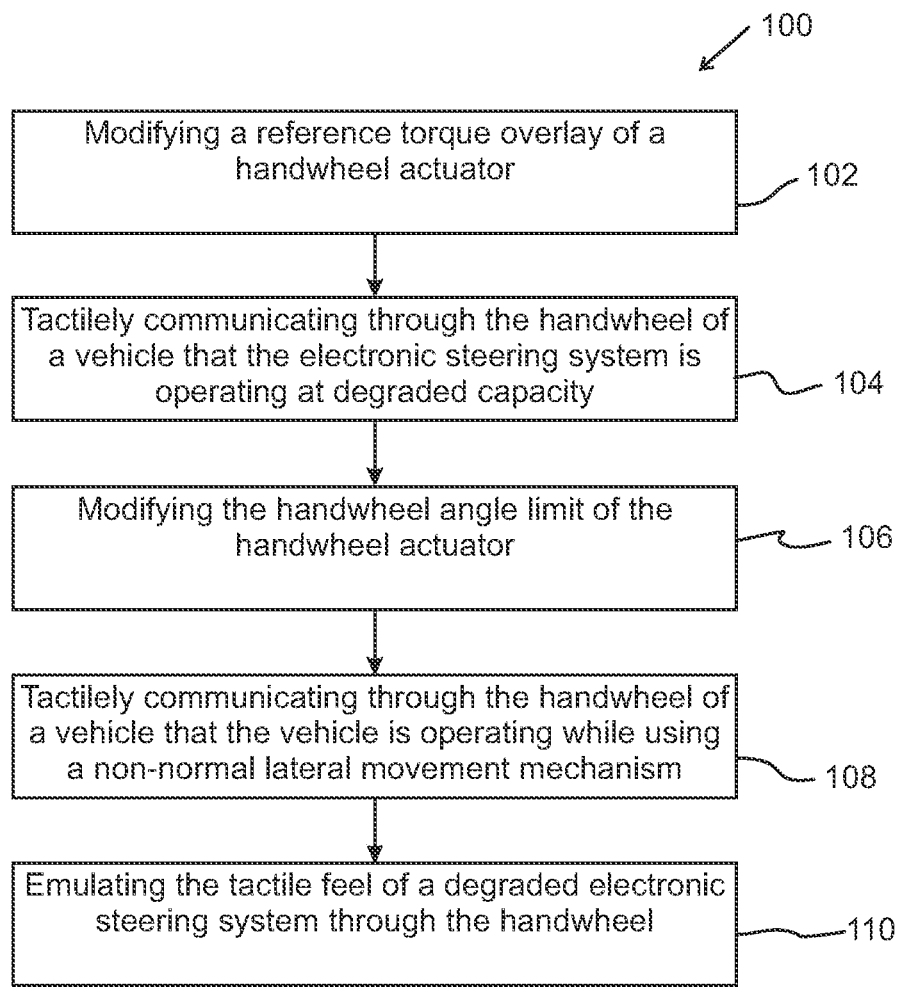
FIG. 1 depicts an illustrative variation of a system with hardware sufficient for carrying out at least some of the methods described herein.

The following description of the variations is merely illustrative in nature and is in no way intended to limit the scope of the invention, its application, or uses.

In a number of illustrative variations, a vehicle may comprise a steering system. In such cases, the steering system may be manually operable by the driver via a steering interface, autonomously operable by an autonomous steering system, or operable as a combination of autonomous and manual steering wherein the steering system is configured to receive and interpret steering input from a driver, the autonomous steering system, or both at the same time.

In a number of illustrative variations, a steering interface may comprise a handwheel, a joystick, a trackball, a slider, a throttle, a pushbutton, a toggle switch, a lever, a touchscreen, a mouse, or any other known means of user input.

In a number of illustrative variations, a vehicle may comprise a steering system comprising a steering interface and a steerable propulsion system such as but not limited to a steering wheel and road wheels, respectively. The steering system may be of the steer-by-wire type wherein physical mechanisms do not mechanically communicate a manipulation of the steering interface to the steerable propulsion system and wherein a manipulation of the steering interface affects an associated manipulation of the steerable propulsion system via the communication of electronic devices such as but not limited to sensors, transceivers, and electronically excited actuators. According to some variations, a steer-by-wire system may include at least one roadwheel actuator and at least one a handwheel actuator in operable communication with one another via an electronic power steering system or controller. The electronic power steering system may include a roadwheel actuator system in operable communication with a handwheel actuator system wherein rotation of the steering wheel of a vehicle translates to actuation of the roadwheel actuator system such that a vehicle wheel may be turned.

The handwheel actuator system may include is steering wheel, a handwheel actuator, such as an electronic motor, and a hand wheel angle sensor. The handwheel actuator system may be constructed and arranged communicate handwheel angle and position to the roadwheel actuator system including at least one steering actuator constructed and arranged to pivot or turn a road wheel.

In a number of illustrative variations, a vehicle may include electronic braking system constructed and arranged to apply brake pressure to any number of road wheels to slow or stop a vehicle based upon driver handwheel input. The electronic braking system may be in operable communication with the electronic power steering system, handwheel actuator system, and roadwheel actuator system via at least one controller. The controller may implement any number of systems, including algorithms, for monitoring and controlling propulsion, steering, and braking. According to some variations, the electronic braking system may be utilized to apply differential brake pressure to a number of wheels to effectuate lateral motion of the vehicle where a portion of a steer-by-wire system has failed, such as an operable disconnect between the wheel actuator system and the roadwheel actuator system. In some instances, where a roadwheel actuator has failed and a handwheel actuator is functioning properly, a brake-to-steer system may be employed to apply brake pressure to individual wheels as a function of driver steering input to a hand wheel. The system may communicate requests to the handwheel actuator to adjust the effort and steering travel limits of the handwheel to communicate to a driver that reduced lateral capacity of the vehicle is present or that the vehicle, or steering system of the vehicle, are in a degraded state.

A brake-to-steer driver feedback system may signal, via the hand wheel of a vehicle, to a driver that a vehicle may be operating in a degraded mode, such as brake-to-steer, and that the vehicle may not be capable of maneuvering as effectively as a driver may be accustomed to, such as where a steer-by-wire system is fully functional.

Drivers may become accustomed to how vehicles traditionally react to driver steering effort, handwheel movement, and end of travel limits of the handwheel in vehicles utilizing steer-by-wire systems. Drivers may expect certain, predictable steering effort and vehicle yaw response to driver steering input. Systems implementing brake-to-steer systems and functionality may have a delay in yaw response to handwheel driver input and reduced lateral capability compared to vehicles utilizing steer-by-wire systems.

Altering tactile handwheel feel to emulate steer-by-wire operation may provide drivers with have a predictable steering effort experience while driving if you call using non normal steering mechanisms such as brake to sear systems. Altering tactile handwheel feel may also provide a means for a vehicle to effectively communicate to a driver that the vehicle is operating using nontraditional steering systems or operating in a faulty or degraded state. In a number of illustrative variations, tactile feedback via the hand wheel of a vehicle may be manipulated by way of requests sent from an electronic control unit to a handwheel actuator via steering feel emulation software module implemented by the electronic control unit.

Increasing or reducing torque within a steering system may occur to modify tactile feedback in a handwheel. A reference torque overlay may include the desired or target steering effort that a driver feels in the handwheel under normal operating conditions. Modifying the torque overlay may include accounting for applied handwheel angle, handwheel rotational velocity, brake pressure requests, and vehicle speed. An electronic control unit in operable communication with a handwheel actuator may increase or reduce torque on the handwheel required by the driver to emulate the feel of a degraded steering system and effectively communicate the limited capability of the steering system to the driver tactilely.

Modifying handwheel angle limits may also occur to modify tactile feedback in a handwheel. Clockwise or counterclockwise rotation of the handwheel may be limited to modify steering effort that a driver feels in the hand wheel during use. Modified handwheel angles may be a function of vehicle dynamic calculations based on reduced lateral capacity when implementing a brake-to-steer system. Modified handwheel angles may prevent a driver from steering or rotating the handwheel beyond a handwheel angle where differential braking lateral capabilities are reduced. An electronic control unit in operable communication with a handwheel actuator may modify handwheel angles as a function of vehicle dynamic calculations to convey to a driver the vehicle is operating while using a unique lateral actuation mechanism such as brake-to-steer.

The system may be further constructed and arranged to provide visual or auditory signals via human to machine interface to notify a driver that brake-to-steer functionality is being implemented by a vehicle and that the vehicle may be in a reduced performance mode. Visual or auditory signals may include lights, noises, or the like readily perceivable by a driver such as where the dashboard may include an illuminated element indicating brake this tier functionality or an audio tone indicating the same.

FIG. 1 depicts an illustrative variation of a system for providing tactile feedback to a driver of a vehicle where an electronic steering system is operating in a failed or degraded state. The system 100 may include modifying 102 a reference torque overlay of a handwheel actuator to provide tactile feedback to a driver in the form of increased resistance when turning a hand wheel, or the like. The system may include tactilely communicating 104 via a handwheel in operable communication with the handwheel actuator that the electronic steering system is operating in a degraded state. The system 100 may also include modifying 106 the handwheel angle limit of the handwheel actuators such that the angle of rotation of the handwheel may be increased or reduced to tactilely communicate 108 through the handwheel that the vehicle may be operating while using a non-normal lateral movement mechanism such as brake-to-steer functionality. The system may emulate 110 the tactile feel of a degraded electronic steering system via the hand wheel according to the modified reference torque overlay and modified handwheel angle limit.

Figure 2:
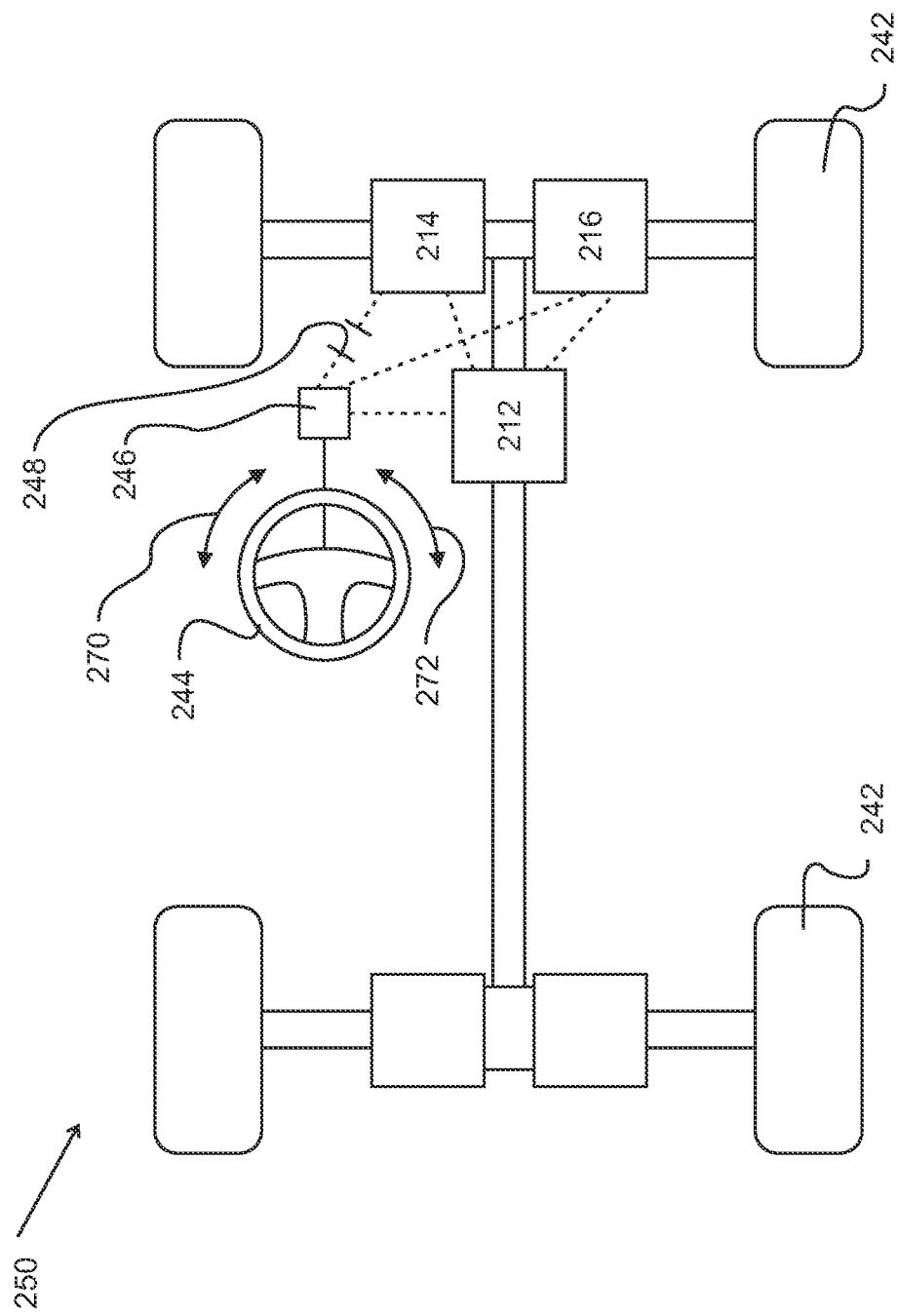
FIG. 2 depicts an illustrative variation of a vehicle equipped with hardware sufficient for carrying out at least some of the systems and methods described herein.

FIG. 2 depicts an illustrative variation of portions of a vehicle implementing a system 250 for providing tactile feedback to a driver of a vehicle where an electronic steering system such as steer-by-wire is operating in a failed or degraded state. A vehicle 250 may include at least one steerable roadwheel 242, an electronic braking system 216, a roadwheel actuator system 214 and a handwheel actuator system 246 as part of a steer-by-wire system, and at least one controller 212 in operable communication with the roadwheel actuator system 214, the electronic braking system 216, and the handwheel actuator system 246. A handwheel 244 may be in operable communication with the handwheel actuator system 246 and may be rotated according to a handwheel angle 272 and may include a reference torque overlay 270. In some instances, the handwheel actuator system 246 and the roadwheel actuator system 214 may be operating in a degraded state that may include failed or faulty communication between the handwheel actuator 246 and the roadwheel actuator system 214. The steer-by-wire system, roadwheel actuator system 214, or handwheel actuator 246 may communicate the degraded state of the roadwheel actuator system 214 to the controller 212, and the controller 212 may implement non-normal lateral movement systems or mechanisms such as brake-to-steer via the electronic braking system 216. In such a case, the controller 212 may provide commands to the handwheel actuator 246 to emulate the tactile feel of a degraded electronic steering system such as a steer-by-wire system by modifying the reference torque overlay 270 and modifying the handwheel angle limit 272.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a method may include implementing at least one electronic control unit in operable communication with an electronic steering system including a handwheel actuator; modifying a reference torque overlay of the handwheel actuator based on at least one of an applied handwheel angle, handwheel rotational velocity, brake pressure requests, or vehicle speed; emulating the tactile feel of a degraded electronic steering system via a handwheel; tactilely communicating to a driver a limited capability of the electronic steering system; modifying at least one handwheel angle limit of the handwheel actuator based on vehicle dynamic calculations of reduced lateral capacity of a vehicle; and tactilely communicating to a driver that a vehicle is operating while using a unique lateral actuation mechanism.

Variation 2 may include a method as in variation 1 further including generating an alert notifying the driver that the vehicle is operating in a degraded mode by providing visual cues via a human to machine interface Variation 2 may include a method as in any of variations 1 through 2 further including generating an alert notifying the driver that the vehicle is operating in a degraded mode by providing audio cues via a human to machine interface.

Variation 4 may include a method as in any of variations 1 through 3 wherein emulating the tactile feel of a degraded electronic steering system via a handwheel includes increasing the torque required to rotate the handwheel.

Variation 5 may include a method as in any of variations 1 through 4 wherein emulating the tactile feel of a degraded electronic steering system via a handwheel includes providing haptic feedback to a driver via the handwheel.

Variation 6 may include a method as in any of variations 1 through 5 emulating the tactile feel of a degraded electronic steering system via a handwheel includes increasing the torque required to rotate the handwheel and reducing the at least one handwheel angle limit.

Variation 7 may include a method as in any of variations 1 through 6 wherein modifying at least one handwheel angle limit of the handwheel actuator includes reducing the at least one handwheel angle limit.

Variation 8 may include a method as in any of variations 1 through 7 wherein tactilely communicating to a driver that a vehicle is operating while using a unique lateral actuation mechanism includes increasing the torque required to rotate the handwheel and reducing the at least one handwheel angle limit.

According to variation 9, a method may include implementing a vehicle including a plurality of vehicle systems including a braking system configured to manipulate a brake set, a steering system configured to adjust a roadwheel direction, and a controller in operable communication with the braking system and steering system; implementing brake-to-steer system via the controller; modifying, via the controller, a reference torque overlay of the handwheel actuator based on at least one of an applied handwheel angle, handwheel rotational velocity, brake pressure requests, or vehicle speed; and modifying, via the controller, at least one handwheel angle limit of the handwheel actuator based on vehicle dynamic calculations of reduced lateral capacity of a vehicle.

Variation 10 may include a method as in variation 9 further including generating an alert notifying a driver that the vehicle is operating in a degraded mode by providing visual cues via a human to machine interface.

Variation 11 may include a method as in any of variations 9 through 10 further including generating an alert notifying a driver that the vehicle is operating in a degraded mode by providing audio cues via a human to machine interface.

Variation 12 may include a method as in any of variations 9 through 11 further including emulating the tactile feel of a degraded electronic steering system via a handwheel including increasing the torque required to rotate the handwheel.

Variation 13 may include a method as in any of variations 9 through 12 further including emulating the tactile feel of a degraded electronic steering system via a handwheel including providing tactile feedback to a driver via the handwheel.

Variation 14 may include a method as in any of variations 9 through 13 wherein emulating the tactile feel of a degraded electronic steering system via a handwheel includes increasing the torque required to rotate the handwheel and reducing the at least one handwheel angle limit Variation 15 may include a method as in any of variations 9 through 14 wherein modifying at least one handwheel angle limit of the handwheel actuator includes reducing the at least one handwheel angle limit.

Variation 16 may include a method as in any of variations 9 through 15 further including tactilely communicating to a driver that the vehicle is operating while using a brake-to-steer system including increasing the torque required to rotate the handwheel and reducing the at least one handwheel angle limit.

According to variation 17 a method may include implementing a vehicle including a plurality of vehicle systems including a human to machine interface, a braking system configured to manipulate a brake set, a steering system configured to adjust a roadwheel direction via a handwheel actuator, and a controller in operable communication with the braking system and steering system; implementing brake-to-steer system via the controller; modifying a reference torque overlay of the handwheel actuator based on at least one of an applied handwheel angle, handwheel rotational velocity, brake pressure requests, or vehicle speed; emulating the tactile feel of a degraded electronic steering system via a handwheel; communicating to a driver a limited capability of the electronic steering system; modifying at least one handwheel angle limit of the handwheel actuator based on vehicle dynamic calculations of reduced lateral capacity of a vehicle; and tactilely communicating to a driver that a vehicle is operating while using a brake-to-steer system.

Variation 18 may include a method as in variation 17 wherein communicating to a driver a limited capability of the electronic steering system includes providing visual cues via the human to machine interface.

Variation 19 may include a method as in any of variations 17 through 18 wherein communicating to a driver a limited capability of the electronic steering system includes providing audio cues via the human to machine interface.

Variation 20 may include a method as in any of variations 17 through 19 wherein tactilely communicating to a driver that the vehicle is operating while using a brake-to-steer system includes increasing the torque required to rotate the handwheel and reducing the at least one handwheel angle limit.

The above description of select variations within the scope of the invention is merely illustrative in nature and, thus, variations or variants thereof are not to be regarded as a departure from the spirit and scope of the invention.

What is claimed is:
1. A method comprising:
implementing a vehicle comprising a plurality of vehicle systems comprising a braking system configured to manipulate a brake set, a steering system configured to adjust a roadwheel direction, and a controller in operable communication with the braking system and the steering system;
implementing brake-to-steer system via the controller;
modifying, via the controller, a reference torque overlay of a handwheel actuator based on at least one of an applied handwheel angle, handwheel rotational velocity, brake pressure requests, or vehicle speed; and modifying, via the controller, at least one handwheel angle limit of the handwheel actuator based on vehicle dynamic calculations of reduced lateral capacity of the vehicle.

2. A method as in claim 1, further comprising generating an alert notifying a driver that the vehicle is operating in a degraded mode by providing a visual cue via a human to machine interface.

3. A method as in claim 1, further comprising generating an alert notifying a driver that the vehicle is operating in a degraded mode by providing an audio cue via a human to machine interface.

4. A method as in claim 1, further comprising:
emulating a tactile feel of a degraded electronic steering system via a handwheel comprising increasing a torque required to rotate the handwheel.

5. A method as in claim 1, further comprising:
emulating a tactile feel of a degraded electronic steering system via a handwheel comprising providing tactile feedback to a driver via the handwheel.

6. A method as in claim 5, wherein emulating a tactile feel of a degraded electronic steering system via a handwheel comprises increasing the torque required to rotate the handwheel and reducing the at least one handwheel angle limit.

7. A method as in claim 1, wherein modifying at least one handwheel angle limit of the handwheel actuator comprises reducing the at least one handwheel angle limit.

8. A method as in claim 1, further comprising:
tactilely communicating to a driver that the vehicle is operating while using the brake-to-steer system comprising increasing a torque required to rotate a handwheel and reducing the at least one handwheel angle limit.

9. A method comprising:
implementing a vehicle comprising a plurality of vehicle systems comprising a human to machine interface, a braking system configured to manipulate a brake set, a steering system configured to adjust a roadwheel direction via a handwheel actuator, and a controller in operable communication with the braking system and steering system;
implementing a brake-to-steer system via the controller;
modifying a reference torque overlay of the handwheel actuator based on at least one of an applied handwheel angle, handwheel rotational velocity, brake pressure requests, or vehicle speed;
emulating the tactile feel of a degraded electronic steering system via a handwheel;
communicating to a driver a limited capability of the steering system;
modifying at least one handwheel angle limit of the handwheel actuator based on vehicle dynamic calculations of reduced lateral capacity of a vehicle; and
tactilely communicating to the driver that the vehicle is operating while using the brake-to-steer system.

10. A method as in claim 9 wherein communicating to the driver the limited capability of the steering system comprises providing visual cues via the human to machine interface.

11. A method as in claim 9 wherein communicating to the driver the limited capability of the electronic steering system comprises providing audio cues via the human to machine interface.

12. A method as in claim 9, wherein tactilely communicating to the driver that the vehicle is operating while using the brake-to-steer system comprises increasing a torque required to rotate the handwheel and reducing the at least one handwheel angle limit.

* * * * *